(12) United States Patent
Flachs et al.

(10) Patent No.: US 7,508,257 B2
(45) Date of Patent: Mar. 24, 2009

(54) LOW-POWER DIGITAL DEMODULATOR

(75) Inventors: Victor Flachs, Rishon Le-Zion (IL); Michal Schramm, Tel Aviv (IL); Ilan Margalit, Tel Aviv (IL)

(73) Assignee: Winbond Electronics Corporation, Hsinchu (TW)

( * ) Notice: Subject to any disclaimer, the term of this patent is extended or adjusted under 35 U.S.C. 154(b) by 162 days.

(21) Appl. No.: 11/517,127

(22) Filed: Sep. 6, 2006

(65) Prior Publication Data

US 2008/0075471 A1    Mar. 27, 2008

(51) Int. Cl.
   *H03K 9/00*       (2006.01)
(52) U.S. Cl. .................. 329/311; 329/347; 375/333; 375/340; 398/202
(58) Field of Classification Search ......... 329/311–314, 329/345, 346, 347; 375/239, 340, 342, 320, 375/333; 327/165, 166, 172, 174; 398/202; 340/825.63–825.65
   See application file for complete search history.

(56) References Cited

U.S. PATENT DOCUMENTS

| | | | | |
|---|---|---|---|---|
| 3,786,360 | A * | 1/1974 | Kawa | 329/311 |
| 5,684,830 | A * | 11/1997 | Ichikawa et al. | 375/254 |
| 5,898,513 | A | 4/1999 | Gist et al. | |
| 6,407,840 | B1 | 6/2002 | Shien-Te et al. | |
| 6,496,549 | B1 * | 12/2002 | Crawford | 375/320 |
| 2004/0208182 | A1 | 10/2004 | Boles et al. | |

FOREIGN PATENT DOCUMENTS

JP         2002232495 A   *   8/2002

OTHER PUBLICATIONS

PC87364, http://www.winbond.com.tw/PDF/APCsheet/PC87364.pdf, Jul. 2000.
SMsC-SLO1000, http://www.smsc.com/main/datasheets/1000db.pdf, Nov. 2004.
USB2231/2, http://www.alldatasheet.com/datasheet-pdf/pdf/126395/SMSC/USB2231.HTML, Jul. 12, 2005.
LPC47N252, http://www.keil.com/dd/docs/datashts/smsc/lpc47n252_ds.pdf, Sep. 2000.
ITE-IT8705F, http://www.iteusa.com/product_info/file/pc/IT8705F_V.0.4.1.pdf, Jan. 6, 2005.

(Continued)

*Primary Examiner*—Robert Pascal
*Assistant Examiner*—Ryan J. Johnson
(74) *Attorney, Agent, or Firm*—Darby & Darby PC

(57) ABSTRACT

Apparatus for demodulating a train of pulses includes a one-shot device having an asynchronous data input terminal, which is configured to receive the train of pulses, and a one-shot data output terminal. A first clocked logic gate has a first clocked data input terminal, which is coupled to the one-shot data output terminal, and a first clocked data output terminal. A combinatorial logic gate has combinatorial input terminals, which are coupled to the one-shot and first clocked data output terminals, and a combinatorial output terminal. A second clocked logic gate has a second clocked data input terminal, which is coupled to the combinatorial output terminal, and a second clocked data output terminal, which is configured to output a demodulated envelope of the train of pulses.

25 Claims, 4 Drawing Sheets

OTHER PUBLICATIONS

Vishay-TSOP321xx, http://www.vishay.com/docs/82229/82229.pdf, Jan. 31, 2005.
RC-5 Protocol, Developed by Royal Philips Electronics, Dec. 11, 2004.
RC-6 Protocol, Developed by Royal Philips Electronics, Sep. 29, 2006.
DM74LS122, http://www.datasheetcatalog.com/datasheets_pdf/D/M/7/4/DM74LS122.shtml, May 1989.
9601/DM9601, http://eshop.engineering.uiowa.edu/NI/pdfs/00/66/DS006610.pdf, Jun. 1989.
FDC37B78x, <http://www.smsc.com/main/datasheets/37b78x.pdf> Apr. 2001.
NEC Protocol, Developed by Nippon Electric Corporation, 2001.
IrCC2.0, <http://www.smsc.com/main/datasheets/ircc20.pdf>, Aug. 1997.
CirCC, <http://www.smsc.com/main/datasheets/circc.pdf>, Aug. 1997.

* cited by examiner

LOW-POWER DIGITAL DEMODULATOR

FIELD OF THE INVENTION

The present invention relates generally to data communication, and specifically to digital receivers that are capable of operating independently of carrier signal frequency.

BACKGROUND OF THE INVENTION

Infrared (IR) communications are widely used in the remote control of consumer electronics devices, such as computers, televisions, and stereo equipment. Binary codes, corresponding to operating commands, are transmitted as modulated IR signals from a remote controller to a target device. The target device demodulates and decodes the signals in order to determine the operation to perform.

Several methods for modulating IR signals are prevalent for consumer electronics infrared (CEIR) transmission. These methods include the RC-5 and RC-6 protocols developed by Royal Philips Electronics, and the NEC protocol, developed by Nippon Electric Corporation. These protocols define how binary codes are encoded as spaces and marks, spaces being periods when no light is emitted by the transmitter and marks being periods when the IR light is pulsed on and off at a particular carrier frequency. (Carrier frequencies between 30 kHz and 56 kHz are typical for CEIR transmission.) Demodulation extracts the envelope of the pulse train corresponding to each mark. Ideally, the envelope of each mark has the form of a single square wave.

Demodulation chips are available for integration into consumer electronics products. Examples of such chips include the "TSOP321 . . . " series, produced by Vishay Semiconductor (Heilbronn, Germany) and described in specifications available at www.vishay.com/doc?82229. The "TSOP321 . . . " series is provided in a range of models, each designed for a specific carrier frequency.

Other manufacturers of IR demodulator chips include Standard Microsystems Corporation ("SMSC") (Hauppauge, New York) and ITE Tech, Inc. (Hsinchu, Taiwan). The IR demodulator chips produced by these manufacturers are generally capable of demodulating IR signals over a range of frequencies. The chips include built-in microcontrollers, which digitally sample received IR signals in order to demodulate the IR signal.

Various methods for demodulating IR signals are described in the patent literature. For example, U.S. Pat. No. 5,898,513, whose disclosure is incorporated herein by reference, describes a method for detecting a carrier frequency by digitally sampling the received IR signal. U.S. Pat. No. 6,407,840, whose disclosure is incorporated herein by reference, describes a method for reducing the energy consumption of an IR demodulator chip by triggering the chip to operate when an IR signal with the expected carrier frequency is detected. U.S. Patent Application Publication 2004/0208182, whose disclosure is incorporated herein by reference, describes a computer configured to receive an IR signal and to execute software to demodulate the received signal.

A retriggerable monostable multivibrator, also referred to as a retriggerable one-shot, may be used to convert a train of digital pulses into a constant digital level. An example of such a device is the DM74LS122 device available from National Semiconductor. The range of carrier frequencies supported by the retriggerable one-shot is set by a combination of an external resistor and capacitor, which also determine a stretch time by which the envelope extends past the last pulse of the pulse train.

SUMMARY OF THE INVENTION

Embodiments of the present invention that are disclosed hereinbelow provide methods and devices for demodulating an encoded signal carried by a modulated pulse train. The embodiments described hereinbelow are particularly useful in decoding consumer electronic infrared (CEIR) signals, but they may also be used in other data transmission applications.

A demodulator circuit converts a pulse train to an envelope having a logic level of "1". In one embodiment, the demodulator circuit comprises a chain of clocked logic gates whose outputs are fed to an a combinatorial logic gate. The range of carrier frequencies supported by the demodulator is not dependent on externally-connected analog devices, but instead is determined by integral parameters, in particular the number of logic gates in the chain and the rate of the clock driving the logic gates. The envelope is longer than the pulse train by a stretch time that is also dependent on the number of logic gates in the chain, but is independent of the amplitude of the received pulses. The circuit is capable of operating at low power, using a low-frequency clock.

There is therefore provided, in accordance with an embodiment of the present invention, apparatus for demodulating a train of pulses, including:

a one-shot device having an asynchronous data input terminal, which is configured to receive the train of pulses, and a one-shot data output terminal;

a first clocked logic gate having a first clocked data input terminal, which is coupled to the one-shot data output terminal, and a first clocked data output terminal;

a combinatorial logic gate having combinatorial input terminals, which are coupled to the one-shot and first clocked data output terminals, and a combinatorial output terminal;

a second clocked logic gate having a second clocked data input terminal, which is coupled to the combinatorial output terminal, and a second clocked data output terminal, which is configured to output a demodulated envelope of the train of pulses.

In a disclosed embodiment, the one-shot device and the first and second clocked logic gates have clock inputs, which are driven by the rising and falling edges of a common clock. In one embodiment, the common clock has a clock frequency of 32.768 kHz, and the train of pulses has a carrier frequency greater than 36 kHz.

In some embodiments, the train of pulses is included in a signal modulated in accordance with a consumer electronic infrared (CEIR) protocol, which may be selected from a group of protocols consisting of an RC-5 protocol, an RC-6 protocol, and a NEC protocol.

Typically, the demodulated envelope includes a temporal stretch of the envelope following a final pulse in the train of pulses, and the temporal stretch is independent of an amplitude of the pulses. A number of the clocked logic gates included in the apparatus and a frequency of a clock input to the clocked logic gates determine a duration of the temporal stretch, and the apparatus may include a decoder circuit, which is coupled to receive and decode the demodulated envelope while deducting the temporal stretch from the envelope according to the duration.

In a disclosed embodiment, a third clocked logic gate having a third clocked data input terminal, which is coupled to the first clocked data output terminal, and a third clocked data output terminal, wherein one of the combinatorial input terminals of the combinatorial logic gate is coupled to the third clocked data output terminal. In one embodiment, the common clock has a clock frequency of 32.768 kHz, and the train of pulses has a carrier frequency greater than 21.8 kHz.

In a disclosed embodiment, the clocked logic gates and the one-shot device include flip-flops and the combinatorial logic gate includes an OR gate, and wherein the one-shot device has an initial clocked data input terminal coupled to a "0" logic level.

There is also provided, in accordance with an embodiment of the present invention, a method for demodulating a train of pulses, including:

receiving the train of pulses at an asynchronous data input terminal of a one-shot device having a one-shot data output terminal;

coupling the one-shot data output terminal to a first clocked data input terminal of a first clocked logic gate having a first clocked data output terminal;

coupling the one-shot and first clocked data output terminals to combinatorial input terminals of a combinatorial logic gate having a combinatorial output terminal;

coupling the combinatorial output terminal to a second clocked data input terminal of a second clocked logic gate having a second clocked data output terminal, so as to output a demodulated envelope of the train of pulses from the second clocked data output terminal.

There is additionally provided, in accordance with an embodiment of the present invention, an infrared (IR) receiver, including:

an IR sensor, which is configured to receive an IR signal including a train of pulses that is transmitted at a carrier frequency and is modulated with data, and to generate a modulated electrical signal responsively to the IR signal;

a demodulator, including:

a one-shot device having an asynchronous data input terminal, which is configured to receive the train of pulses, and a one-shot data output terminal;

a first clocked logic gate having a first clocked data input terminal, which is coupled to the one-shot data output terminal, and a first clocked data output terminal;

a combinatorial logic gate having combinatorial input terminals, which are coupled to the one-shot and first clocked data output terminals, and a combinatorial output terminal; and a second clocked logic gate having a second clocked data input terminal, which is coupled to the combinatorial output terminal, and a second clocked data output terminal, which is configured to output a demodulated envelope of the train of pulses; and a decoder, which is coupled to receive and process the demodulated envelope so as to decode the data.

The present invention will be more fully understood from the following detailed description of the embodiments thereof, taken together with the drawings in which:

DETAILED DESCRIPTION OF EMBODIMENTS

Figure 1:
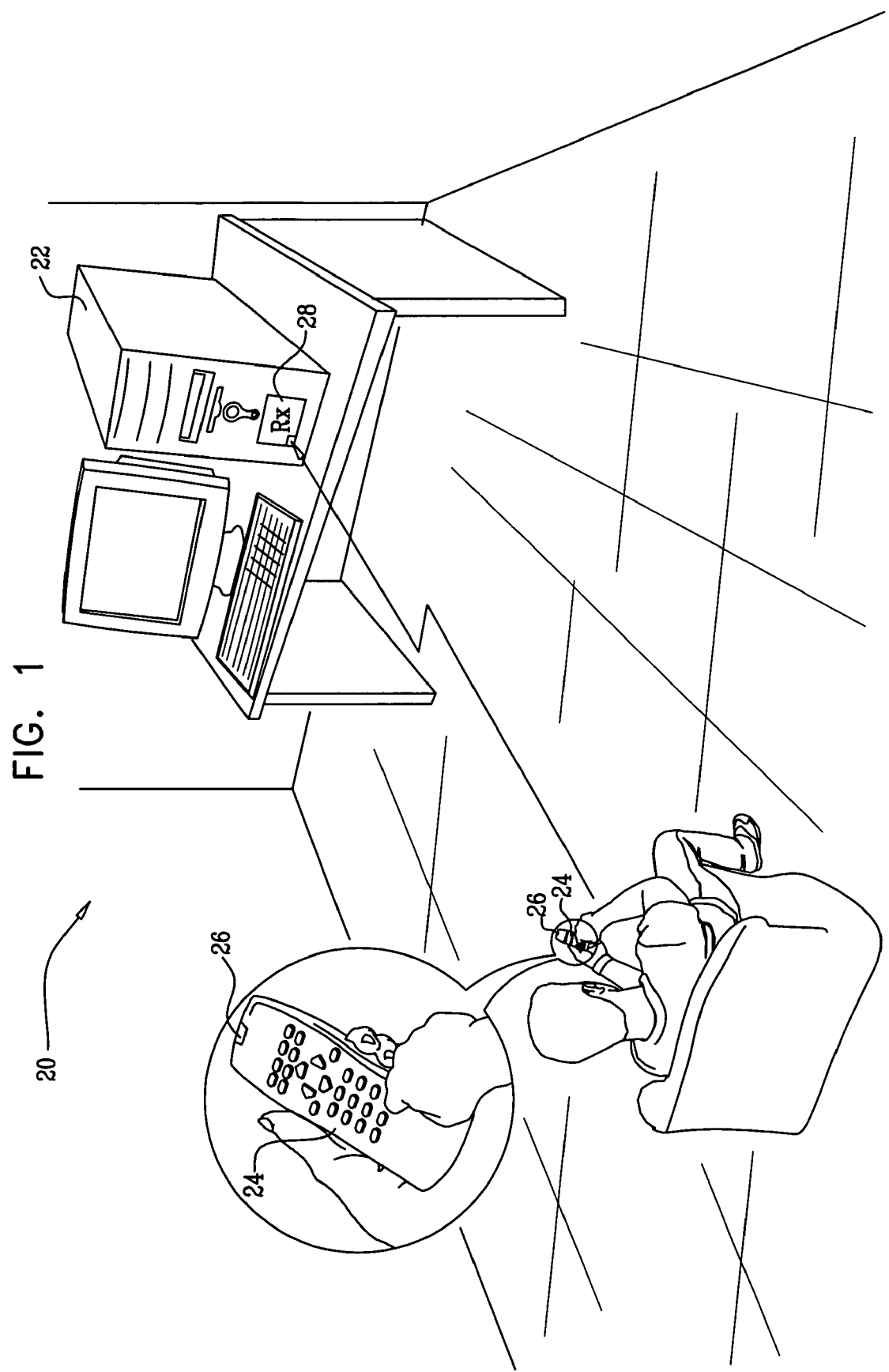
FIG. 1 is a schematic, pictorial illustration of a consumer electronics system using CEIR remote control, in accordance with an embodiment of the present invention.

FIG. 1 is a schematic, pictorial illustration of a system 20 using CEIR remote control, in accordance with an embodiment of the present invention. A user of the system controls a device, represented as a multimedia station 22, using an IR remote controller 24. Multimedia station 22 is representative of a wide range of devices, such as consumer electronics products, as well as industrial equipment, which may be remotely controlled. Controller 24 comprises an IR transmitter 26, which emits IR signals in response to commands entered by the user.

The IR signals emitted by transmitter 26 are modulated in accordance with a predetermined protocol, such as the RC-5, RC-6 or NEC CEIR protocols mentioned above. Marks are transmitted at a carrier frequency anywhere in the range of 30-56 kHz (with an additional tolerance of up to 10% above or below the range). An IR receiver 28 senses, demodulates, and decodes the IR signals in order to provide instructions to station 22. An identification of the protocol used by transmitter 26 may be input to receiver 28 in advance, typically by setting a switch on station 22 or keying in a configuration input to the station, for example.

Figure 2:
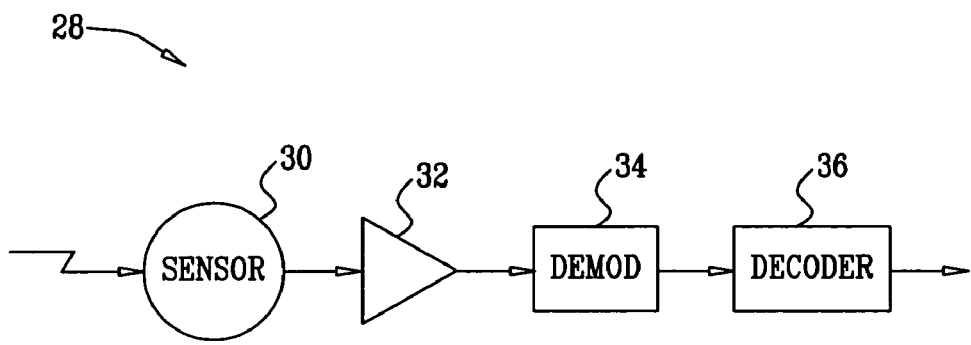
FIG. 2 is a block diagram that schematically shows details of an IR receiver, in accordance with an embodiment of the present invention.

FIG. 2 is a block diagram that schematically shows details of receiver 28, in accordance with an embodiment of the present invention. An IR sensor 30, such as a photodiode, generates an electrical output in response to the IR pulses emitted by transmitter 26. The electrical output includes pulse trains corresponding to marks in the modulated IR signal. An amplifier 32 amplifies the electrical output, and a demodulator 34 extracts the envelope of each pulse train (as shown below in FIG. 3) to generate a demodulated signal. This demodulated signal is then sampled and decoded by decoder circuitry 36, typically using methods such as those described in detail in a U.S. patent application entitled, "Carrier Frequency Independent Receiver," filed on even date, which is assigned to the assignee of the present patent application, and whose disclosure is incorporated herein by reference. Alternatively, other methods and circuits may be used for decoding, as are known in the art.

Figure 3:
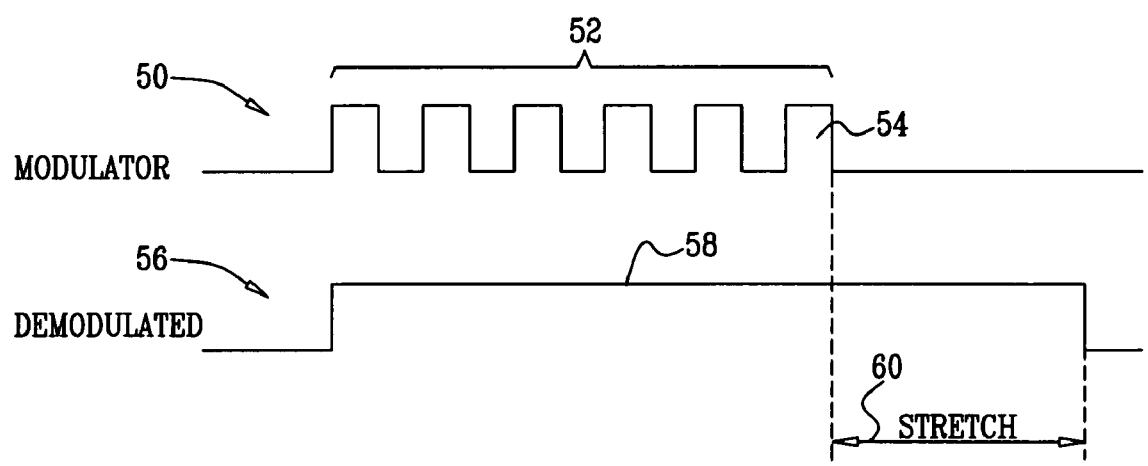
FIG. 3 is a signal timing diagram that schematically shows a modulated pulse train and its demodulated envelope, in accordance with an embodiment of the present invention.

FIG. 3 is a signal timing diagram that schematically shows a modulated signal 50 received by sensor 30 and a corresponding demodulated signal 56 generated by demodulator 34, in accordance with an embodiment of the present invention. A pulse train 52 in modulated signal 50 is converted to an envelope 58 in demodulated signal 56. Following a last pulse 54 of the pulse train, envelope 58 extends for a period indicated as a stretch time 60. The stretch time is fixed, depending on the configuration and timing of demodulator 34, as described hereinbelow, but it is independent of the amplitude of the pulses in pulse train 52. This amplitude-independence is a result of the all-digital design of the demodulator, in contrast to the amplitude-dependence of demodulators that use analog filtering.

Figure 4:
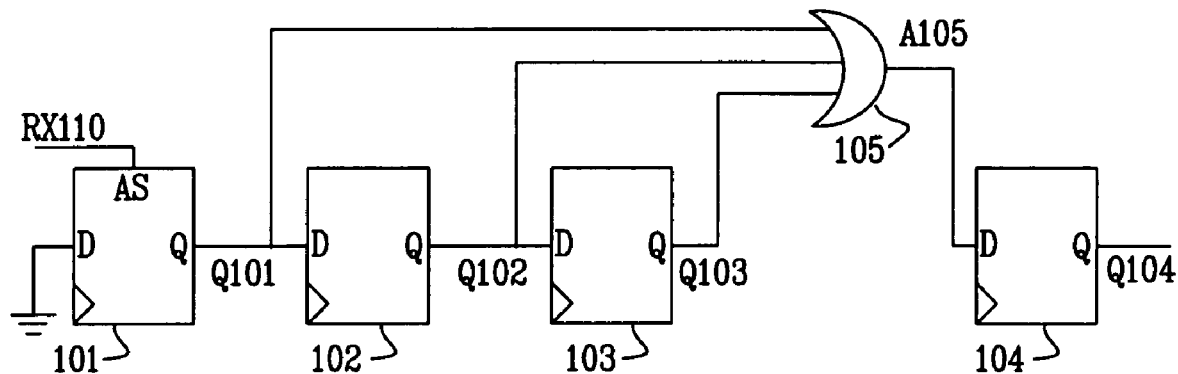
FIG. 4 is a schematic diagram of a digital demodulator circuit, in accordance with embodiments of the present invention.

FIG. 4 is a schematic diagram of circuitry of demodulator 34, in accordance with an embodiment of the present invention.

Figure 5:
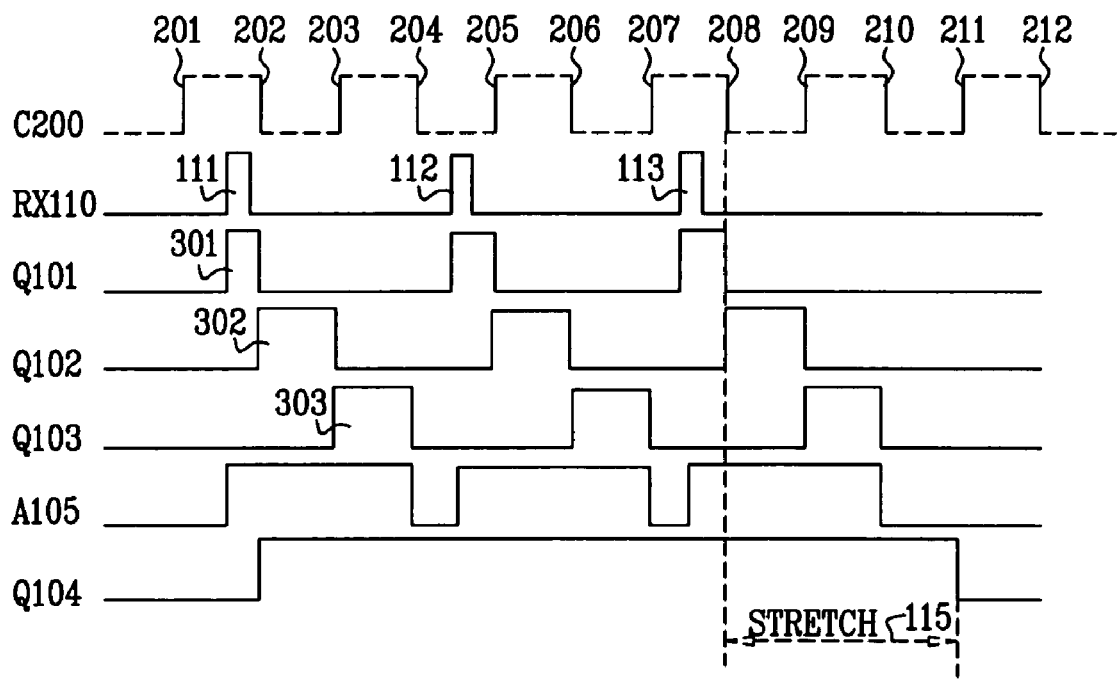
FIG. 5 is a signal timing diagram that schematically illustrates the signals flowing through the demodulator circuit of FIG. 4, in accordance with an embodiment of the present invention.

Demodulator 34 comprises four clocked logic gates, indicated in FIG. 4 as a one-shot 101, and flip-flops 102, 103, and 104. Flip-flops 102, 103 and 104 are "D" type flip-flops, with "D" input terminals and "Q" output terminals. The signal timing of one-shot 101 and of the other logic gates indicated in FIG. 4 is described further hereinbelow (FIG. 5). In some embodiments, one-shot 101 is implemented as a "D" type flip-flop, in the manner of flip-flops 102, 103, and 104. One-shot 101 may therefore have a "D" input, which may be tied to logical "0" in order that an output signal of one-shot 101, Q101, may be based on an input to an asynchronous set (AS) terminal.

A modulated signal, indicated as input RX110, is demodulated by inputting the signal to the AS terminal of one-shot 101. An output signal Q104, generated at the "Q" output terminal of flip-flop 104 is the corresponding demodulated signal.

One-shot 101 and flip-flops 102 and 103 are chained together, such that the output Q101 of one-shot 101 is fed to the "D" input of flip-flop 102, and the "Q" output of flip-flop 102, indicated as Q102, is input to the "D" input of flip-flop 103, whose output is Q103. Outputs Q101, Q102, and Q103 are input to a combinatorial logic gate, which is implemented as an OR logic gate 105. The output of gate 105, A105, is input to flip-flop 104.

All four clocked logic gates are driven on the rising and falling edges of a common clock signal. As described further hereinbelow, when the clock is based on a standard 32.768 kHz source, demodulator 34 can demodulate pulse trains in the standard CEIR range of 30-56 kHz. The 32.768 kHz source is a widely used industry standard. Use of such a low-frequency clock, relative to the carrier frequency, means that the demodulator consumes relatively little power. Generally, a circuit operating at this speed consumes less energy than circuits running at higher speeds, such as circuits described in the Background that operate by sampling the modulated signal.

FIG. 5 is a signal timing diagram that schematically illustrates the signals flowing through the circuitry of demodulator 34 that are shown in FIG. 4, in accordance with an embodiment of the present invention. Modulated signal RX110 is shown as comprising a pulse train of three pulses, 111, 112, and 113. In standard CEIR protocols, marks generally comprise sixteen or more pulses, but a train of three pulses is sufficient to describe the demodulation process implemented by demodulator 34. The demodulation process is effective for any number of pulses in the pulse train.

C200 is the clock signal driving the clocked logic gates of demodulator 34. To support the standard CEIR carrier frequency range of 30-56 kHz, C200 triggers clocked logic gates 101-104 on both the rising and falling edges of a standard 32.758 kHz clock source. In embodiments of the present invention, the clocked logic gates are specifically designed as customized circuits that are triggered on both the rising and falling edges of the clock. The triggering edges are represented as triggers 201-212 in the diagram of signal C200. Alternatively, other types of clock sources and clock frequencies may be used.

Pulse 111 of signal RX110 immediately sets Q101 high. Q101 remains high, as indicated by pulse 301, until subsequent clock trigger 202 is received. Because Q101 is high when clock trigger 202 is received, Q102 is set high until subsequent clock trigger 203 is received, as indicated by pulse 302. Next, at clock trigger 203, Q103 is set high, as indicated by pulse 303, and remains high until subsequent clock trigger 204 is received. During the duration of pulses 301, 302, and 303, signal A105 is high. Consequently, A105 is high when clock trigger 202 is received, which causes the demodulator output at Q104 to be set high. Q104 remains high until A105 drops low and a subsequent clock trigger is received while A105 is low. When the carrier frequency of the pulse train is within the operating range of the demodulator, Q104 remains high until the last pulse of the pulse train has been received, as described further hereinbelow.

After pulse 111 has propagated through the chain of clocked logic gates, as pulses 301, 302, and 303, respectively, A105 drops low. It may therefore be seen that in the absence of subsequent pulses of RX110, A105 goes low two clock triggers after the trigger that raised Q104. If a new pulse on RX110 is not received before a subsequent, third clock trigger, then Q104 will be reset upon receiving the subsequent, third clock trigger.

In the present example, a second pulse 112 is received before clock trigger 205, thereby setting Q101 and A105 high and preventing Q104 from dropping low upon clock trigger 205. Pulse 112, like pulse 111, initiates a propagation of pulses in signals Q101, Q102, and Q103. Subsequent pulse 113 causes a similar propagation. Since pulse 113 is received before clock trigger 208, Q104 remains high until clock trigger 211. Clock trigger 211 then resets Q104 low, because pulse 113 has propagated through Q101, Q102, and Q103, and A105 has dropped low.

As described above, three clock triggers define the minimum rate at which pulses of RX110 must be received to prevent Q104 from dropping low between pulses. When the pulse rate is faster, Q104 remains high throughout the duration of the pulse train, and signal RX110 is thus demodulated. At a slower pulse rate, Q104 falls between pulses and therefore does not provide an envelope corresponding to the pulse train.

When the clock trigger is set to the leading and trailing edges of a 32.768 kHz clock, the trigger rate is 65.536 kHz, and the time between triggers is $$1/(65.536 \text{ kHz})=15.26 \text{ }\mu\text{sec}.$$

Thus, the elapsed time of three triggers, also referred to hereinbelow as the demodulator time constant, is $$3\times15.26=45.78 \text{ }\mu\text{sec}.$$

Demodulator 34 is therefore capable of demodulating pulse trains with carrier frequencies as slow as $$[1/(45.78 \text{ }\mu\text{sec})]=21.8 \text{ kHz},$$

which means that frequencies in the standard range of 30-56 kHz can be demodulated, including an additional tolerance below 30 kHz.

Q104 remains high after each pulse for at most a period equal to the demodulator time constant. The time constant thus defines a stretch time 115. For certain applications, a shorter stretch time may be desirable. A shorter time may be achieved by reducing the time to propagate pulses through the chain of clocked logic gates, as described below with respect to FIG. 6.

Figure 6:
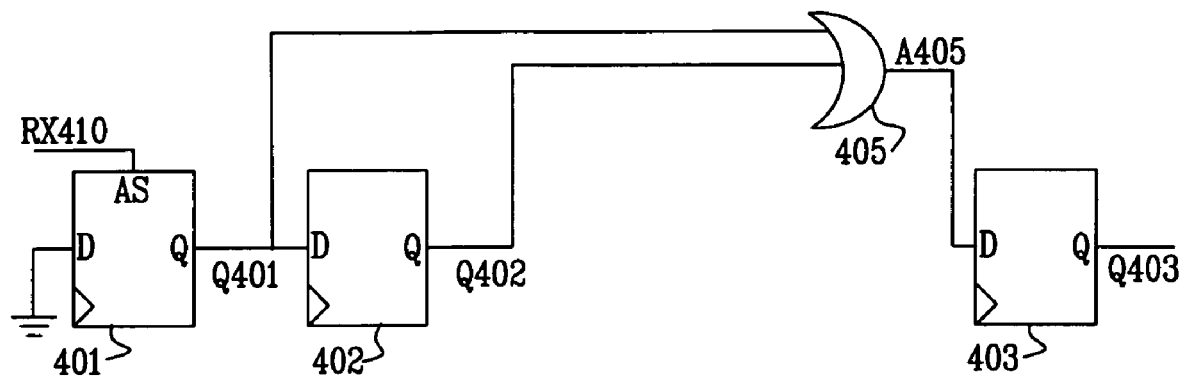
FIG. 6 is a schematic diagram of an alternative digital demodulator, in accordance with embodiments of the present invention.

FIG. 6 is a schematic diagram of an alternative digital demodulator 400 that provides a shorter stretch time, in accordance with an embodiment of the present invention. The stretch time is reduced by removing one of the flip-flops in demodulator 34. Demodulator 400 comprises only two chained, clocked logic gates, these being a one-shot 401 and a flip-flop 402. A modulated signal RX410 is received at an AS terminal of one-shot 401, and the output Q401 is input to flip-flop 402. As in the case of demodulator 34, one-shot 101 may be implemented as a "D" type flip flop having a "D" input connected to logic level 0. An OR gate 405 receives outputs Q401 and Q402 from the respective clocked logic gates 401 and 402, and provides signal A405 to a flip-flop 403. The output of flip-flop 403 is Q403, which is the desired, demodulated signal.

Figure 7:
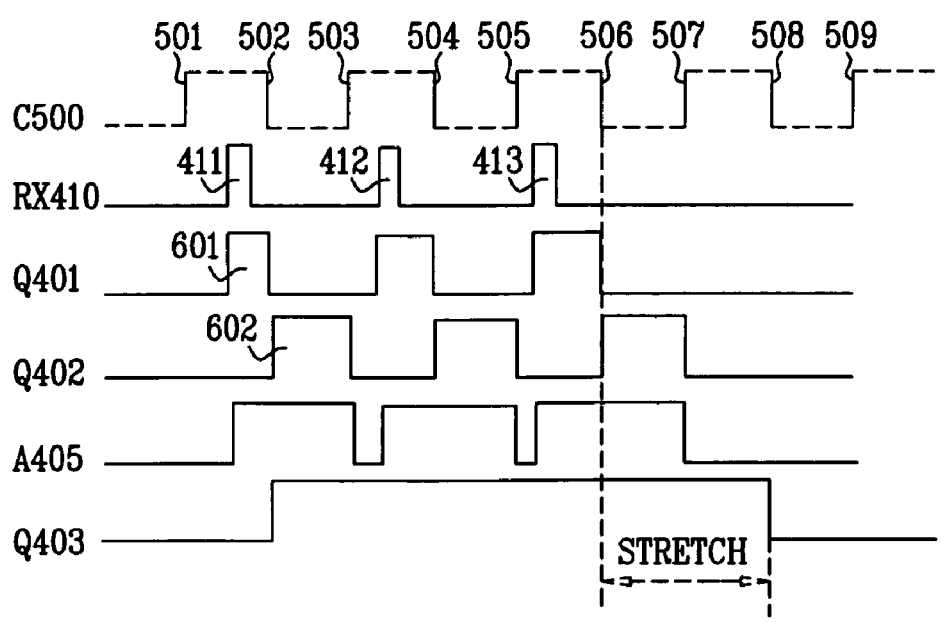
FIG. 7 is a signal timing diagram that schematically illustrates the signals flowing through the alternative demodulator circuit of FIG. 6, in accordance with an embodiment of the present invention.

FIG. 7 is a signal timing diagram that schematically illustrates the signals flowing through alternative demodulator 400, in accordance with an embodiment of the present invention. Modulated signal RX410 is shown as comprising a pulse train of three pulses, 411, 412, and 413. C500 is a 32.768 kHz clock signal, which drives the clocked logic gates of demodulator 400 on both the rising and falling edges of the clock signal. Triggering edges of the driving clock, C500, are represented as clock triggers 501-509.

Pulse 411 of signal RX410 sets Q401 high, thereby generating a pulse 601. Pulse 601 remains high until subsequent clock trigger 502. Clock trigger 502 also sets Q402 high, generating a pulse 602 which remains high until subsequent clock trigger 503 is received. During the duration of pulses 601 and 602, signal A405 is high. A405 is high when clock trigger 502 is received, which causes Q403 to be set. In contrast to the operation of demodulator 34, A405 goes low only one clock trigger after the trigger that raises Q403. If a subsequent pulse is not received before a subsequent, second clock trigger, then Q403 will be reset upon receiving the subsequent clock trigger. Thus, the time constant of demodulator 400 is only two clock triggers. In the present example, pulse 412 is received before clock trigger 504, and pulse 413 is received before clock trigger 506. Consequently, Q403 remains high until clock trigger 208.

As described above, two clock triggers define the minimum rate at which pulses of RX410 can be received. The time between triggers is 15.26 μsec, as calculated above. The elapsed time of two triggers, which is therefore the demodulator time constant, as well as the stretch time, is $$2 \times 15.26 = 30.52 \; \mu sec.$$

Demodulator 400 thus has a shorter stretch time than demodulator 34. However, the range of supported carrier frequencies is smaller. Demodulator 400 is capable of demodulating pulse trains with a minimum carrier frequency, including a 10% tolerance, of $$[1.1/(30.52 \; \mu sec)] = 36.0 \; kHz.$$

Demodulator 400 and demodulator 34 have time constants that are equal to two and three clock triggers, respectively. Adding additional flip-flops to the chain of clocked logic gates causes corresponding, multiplicative increases in the demodulator time constant. The supported range of carrier frequencies and the stretch time are both dependent on the time constant, and these parameters therefore are determined by the number of flip-flops used in the demodulator. In further embodiments of the present invention, decoder circuitry 36 is programmed or tuned to remove the stretch time from the envelope, according to the demodulator time constant.

Demodulators designed in the manner of demodulators 400 and 34 may be implemented in custom or semi-custom integrated circuits. Although the one-shot and clocked logic gates in the designs described above comprise flip-flops, and an OR gate is used as the combinatorial logic gate, alternative implementations of these elements will be apparent to those skilled in the art and are considered to be within the scope of the present invention. Both discrete and integrated implementations of such demodulators can operate at low clock frequencies and have low levels of power consumption relative to demodulators known in the art.

Although the embodiments described above relate specifically to the remote control of a consumer electronics product, such as a television, the principles of the present invention may also be applied to the demodulation of any signal carried by a modulated pulse train. Furthermore, the principles of the present invention may likewise be applied in the context of other environments and other communications technologies.

It will thus be appreciated that embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for demodulation, comprising:
    a one-shot device having an asynchronous data input terminal, which is configured to receive a first train of input pulses having respective first durations, and to output on a one-shot data output terminal a second train of output pulses having respective second durations that are longer than the first durations of the corresponding input pulses;
    a first clocked logic gate having a first clocked data input terminal, which is coupled to the one-shot data output terminal, and a first clocked data output terminal;
    a combinatorial logic gate having combinatorial input terminals, which are coupled to the one-shot and first clocked data output terminals, and a combinatorial output terminal; and
    a second clocked logic gate having a second clocked data input terminal, which is coupled to the combinatorial output terminal, and a second clocked data output terminal, which is configured to output a demodulated envelope of the first train of input pulses.

2. The apparatus according to claim 1, wherein the one-shot device and the first and second clocked logic gates have clock inputs, which are driven by the rising and falling edges of a common clock.

3. The apparatus according to claim 2, wherein the common clock has a clock frequency of 32.768 kHz.

4. The apparatus according to claim 3, wherein the first train of input pulses has a carrier frequency greater than 36 kHz.

5. The apparatus according to claim 1, wherein the first train of input pulses is comprised in a signal modulated in accordance with a consumer electronic infrared (CEIR) protocol.

6. The apparatus according to claim 5, wherein the CEIR protocol is selected from a group of protocols consisting of an RC-5 protocol, an RC-6 protocol, and a NEC protocol.

7. The apparatus according to claim 1, wherein the demodulated envelope comprises a temporal stretch of the envelope following a final pulse in the first train of input pulses, and wherein the temporal stretch is independent of an amplitude of the input pulses.

8. The apparatus according to claim 7, wherein a number of the clocked logic gates comprised in the apparatus and a frequency of a clock input to the clocked logic gates determine a duration of the temporal stretch, and comprising a decoder circuit, which is coupled to receive and decode the demodulated envelope while deducting the temporal stretch from the envelope according to the duration.

9. The apparatus according to claim 1, and comprising a third clocked logic gate having a third clocked data input terminal, which is coupled to the first clocked data output terminal, and a third clocked data output terminal,
   wherein one of the combinatorial input terminals of the combinatorial logic gate is coupled to the third clocked data output terminal.

10. The apparatus according to claim 9, wherein the one-shot device and the first, second and third clocked logic gates have clock inputs, which are driven by rising and falling edges of a common clock having a clock frequency of 32.768 kHz.

11. The apparatus according to claim 10, wherein the first train of input pulses has a carrier frequency greater than 21.8 kHz.

12. The apparatus according to claim 1, wherein the clocked logic gates and the one-shot device comprise flip-flops and the combinatorial logic gate comprises an OR gate, and wherein the one-shot device has an initial clocked data input terminal coupled to a "0" logic level.

13. A method for pulses demodulation, comprising:
   receiving a first train of input pulses having respective first durations at an asynchronous data input terminal of a one-shot device having a one-shot data output terminal;
   outputting by the one-shot device a second train of output pulses having respective second durations that are longer than the first durations of the corresponding input pulses;
   providing the second train of output pulses to a first clocked data input terminal of a first clocked logic gate having a first clocked data output terminal;
   coupling the one-shot and first clocked data output terminals to combinatorial input terminals of a combinatorial logic gate having a combinatorial output terminal; and
   coupling the combinatorial output terminal to a second clocked data input terminal of a second clocked logic gate having a second clocked data output terminal, so as to output a demodulated envelope of the first train of input pulses from the second clocked data output terminal.

14. The method according to claim 13, and comprising driving the one-shot device and the first and second clocked logic gates from the rising and falling edges of a common clock.

15. The method according to claim 14, wherein the common clock has a clock frequency of 32.768 kHz.

16. The method according to claim 15, wherein the first train of input pulses has a carrier frequency greater than 36 kHz.

17. The method according to claim 13, wherein receiving the first train of input pulses comprises receiving a signal modulated in accordance with a consumer electronic infrared (CEIR) protocol.

18. The method according to claim 17, wherein the CEIR protocol is selected from a group of protocols consisting of an RC-5 protocol, an RC-6 protocol, and a NEC protocol.

19. The method according to claim 13, wherein outputting the demodulated envelope comprises adding a temporal stretch to the envelope following a final pulse in the first train of input pulses, and wherein the temporal stretch is independent of an amplitude of the input pulses.

20. The method according to claim 19, and comprising determining a duration of the temporal stretch based on a number of the clocked logic gates coupled to the combinatorial input terminals and a frequency of a clock input to the clocked logic gates, and comprising deducting the temporal stretch from the envelope based on the duration in order to decode the demodulated envelope.

21. The method according to claim 13, and comprising:
   coupling the second clocked data output terminal to a third clocked data input terminal of a third clocked logic gate having a third clocked data output terminal; and
   coupling the third clocked data output terminal to one of the combinatorial input terminals of the combinatorial logic gate.

22. The method according to claim 21, wherein the one-shot device and the first, second and third clocked logic gates have clock inputs. which are driven by rising and falling edges of a common clock having a clock frequency of 32.768 kHz.

23. The method according to claim 22, wherein the first train of input pulses has a carrier frequency greater than 21.8 kHz.

24. The method according to claim 13, wherein the one-shot device and the clocked logic gates comprise flip-flops and the combinatorial logic gate comprises an OR gate, and wherein the one-shot device has an initial clocked data input terminal, and comprising coupling the initial clocked data input terminal to a "0" logic level.

25. An infrared (IR) receiver, comprising:
   an IR sensor, which is configured to receive an IR signal comprising a first train of input pulses having respective first durations that is transmitted at a carrier frequency and is modulated with data, and to generate a modulated electrical signal responsively to the IR signal;
   a demodulator, comprising:
      a one-shot device having an asynchronous data input terminal, which is configured to receive the first train of input pulses and to output on a one-shot data output terminal a second train of output pulses having respective second durations that are longer than the first durations of the corresponding input pulses;
      a first clocked logic gate having a first clocked data input terminal, which is coupled to the one-shot data output terminal, and a first clocked data output terminal;
      a combinatorial logic gate having combinatorial input terminals, which are coupled to the one-shot and first clocked data output terminals, and a combinatorial output terminal; and
      a second clocked logic gate having a second clocked data input terminal, which is coupled to the combinatorial output terminal, and a second clocked data output terminal, which is configured to output a demodulated envelope of the first train of input pulses; and
   a decoder, which is coupled to receive and process the demodulated envelope so as to decode the data.

* * * * *